(12) United States Patent
Muraoka et al.

(10) Patent No.: US 7,601,464 B2
(45) Date of Patent: Oct. 13, 2009

(54) ELECTRODE CORE MATERIAL AND BATTERY USING THE SAME

(75) Inventors: Yoshiyuki Muraoka, Kamakura (JP);
Yoichiro Tsuji, Katano (JP); Masaharu Miyahisa, Fujisawa (JP)

(73) Assignee: Panasonic Corporation, Osaka (JP)

( * ) Notice: Subject to any disclaimer, the term of this patent is extended or adjusted under 35 U.S.C. 154(b) by 473 days.

(21) Appl. No.: 10/326,329

(22) Filed: Dec. 19, 2002

(65) Prior Publication Data
US 2003/0148186 A1  Aug. 7, 2003

(30) Foreign Application Priority Data
Dec. 20, 2001 (JP) .............................. 2001-387040
Oct. 7, 2002 (JP) .............................. 2002-293343

(51) Int. Cl.
*H01M 4/70* (2006.01)
(52) U.S. Cl. .............................. 429/243; 429/237; 29/2
(58) Field of Classification Search ................. 429/243, 429/241, 249, 209, 237; 29/2
See application file for complete search history.

(56) References Cited

U.S. PATENT DOCUMENTS

| | | | | |
|---|---|---|---|---|
| 4,347,429 A | * | 8/1982 | Will .............................. | 392/325 |
| 5,641,591 A | * | 6/1997 | Kawakami et al. ....... | 429/231.5 |
| 6,120,937 A | * | 9/2000 | Kojima et al. ................ | 429/223 |

FOREIGN PATENT DOCUMENTS

| | | | |
|---|---|---|---|
| JP | 5187732 | A | 7/1976 |
| JP | 59132563 | A * | 7/1984 |
| JP | 6181061 | A | 6/1994 |
| JP | 07-130370 | A | 5/1995 |
| JP | 09-007603 | A | 1/1997 |

* cited by examiner

*Primary Examiner*—Jane Rhee
(74) *Attorney, Agent, or Firm*—Panitch Schwarze Belisario & Nadel LLP

(57) ABSTRACT

An electrode core material has a substrate and at least one porous material layer diffusion-bonded to the substrate. The substrate is made of a metal foil processed into a three-dimensional structure which is substantially deformed from a major plane of the metal foil, preferably having bulge portions which protrude from at least one side of the metal foil, the bulge portions preferably having a curved, strip-shaped form between laterally spaced slits in the metal foil. The porous material layer is made of metal fine particles diffusion-bonded to each other, and the porous material layer has a three-dimensional structure which is substantially uniform in thickness and porosity. Methods are provided for producing the electrode core material by diffusion bonding the porous material layer to the substrate either before or after deforming the metal foil. The electrode core material may be used for the positive and/or negative electrode of an alkaline storage battery.

19 Claims, 5 Drawing Sheets

ELECTRODE CORE MATERIAL AND BATTERY USING THE SAME

BACKGROUND OF THE INVENTION

Heretofore, there has been proposed a positive electrode plate for an alkaline storage battery, which plate comprises a foamed nickel substrate having three-dimensionally continuous pores with a porosity of approximately 95% and an active material, such as spherical nickel hydroxide particles, retained in the substrate. At present, this positive electrode is being widely used as a positive electrode capable of yielding a high-capacity alkaline storage battery. However, the above-mentioned foamed nickel substrate is quite expensive, because it is produced by coating a polyurethane foam with nickel plating, followed by firing to remove the polyurethane foam.

In contrast, core materials having a two-dimensional structure, such as a punched metal sheet or an expanded metal sheet, are inexpensive, since they are generally produced by mechanical processes. Such core materials having no three-dimensional structure, however, may present such problems as detachment (peeling or exfoliation) of the active material, reduction in active material utilization rate, and reduction in high-rate discharge characteristic.

Attempts have been made to process a metal plate into a three-dimensional structure in order to suppress the detachment of the active material and the reduction in active material utilization rate. For example, there has been proposed a nickel positive electrode for an alkaline storage battery, which employs a core material (hereinafter, referred to as "core material X") having square through-holes with pyramidal projections protruding in opposite directions in an alternating manner (e.g., see Japanese Unexamined Patent Publication No. Hei 7-130370).

However, even the use of the above-described core material X is not sufficient to suppress the detachment of the active material from the electrode plate. More specifically, when the electrode plate is pressed into a predetermined thickness in the manufacturing process of the electrode plate in order to improve the packing density of the active material, a stress is applied to the interface between the core material and the active material layer owing to their difference in rate of elongation, thereby in some cases resulting in the peeling of the active material layer from the core material. Accordingly, the current collection properties become insufficient, making it impossible to yield a sufficient high-rate discharge characteristic. In addition, the expansion and contraction of the active material, due to repeated charge/discharge cycles, also cause the active material layer to be peeled off from the core material, resulting in the problem of decreased capacity.

Meanwhile, attempts have been made to form fine projections comprising a metal powder, such as nickel powder, on the surface of the above-described core material X (e.g., see Japanese Unexamined Patent Publication No. Hei 9-7603). However, even with the use of core material X having the fine projections, it is impossible to solve the above-discussed problems which occur during the pressing of the electrode plate.

Moreover, it is difficult to uniformly form the fine projections comprising a metal powder on the surface of the core material X. Even the application of a metal powder onto the core material surface by spraying or the like cannot achieve a sufficiently uniform formation of the fine projections. An electrode plate employing such core material is susceptible to the peeling of the active material layer from the core material, so that the discharge characteristic and charge/discharge cycle characteristic of the battery are likely to decrease.

There have also been proposed various methods of roughening the core material surface in order to improve the adhesion between the core material and the active material layer. For example, electrolytic deposition, etching, sandblasting, and the like have been tried. However, these methods are also not sufficient to reduce the above-discussed problems which occur during the pressing of the electrode plate.

BRIEF SUMMARY OF THE INVENTION

The present invention has been achieved in view of the foregoing problems. An object of the present invention is to suppress the peeling between the core material and the active material layer, while reducing the decrease in charge/discharge cycle characteristic and high-rate discharge characteristic, by forming on a substrate of a core material a porous material layer comprising diffusion-bonded metal fine particles and having a uniform three-dimensional structure.

The present invention includes an electrode core material comprising:
a substrate and at least one porous material layer diffusion-bonded to the substrate,
the substrate comprising a metal foil having a three-dimensional structure which is substantially deformed from a major plane of the metal foil,
the porous material layer comprising metal fine particles diffusion-bonded to each other, and
the porous material layer having a three-dimensional structure which is substantially uniform in thickness and porosity.

It is preferable that three-dimensional structure of the substrate comprise a plurality of curved bulges protruding from at least one of a front and a back side of said substrate, the curved bulges preferably having a strip-shaped form which is laterally bounded by slits in the metal foil, and the curved bulges preferably protruding in an alternating manner from the front and back sides of the substrate More preferably, the above-mentioned core material comprises:
a plurality rows of bulge portions and a flat portion, having a predetermined width, interposed between the rows of bulge portion,
each of the rows of bulge portion comprising first and second strip-shaped, curved bulge portions, the first and second strip-shaped, curved bulge portions respectively protruding from the front and back sides of the core material in an alternating manner along a first direction, and
the bulge portion rows being aligned along a second direction orthogonal to the first direction.

It is preferable that the thickness of the porous material layer on the substrate be about 5 to 50 μm per one layer.

It is preferable that the above-mentioned metal foil comprise electrolytic nickel and have a thickness of about 10 to 35 μm before being processed.

The present invention also includes a first method of producing an electrode core material, comprising the steps of:
(a) preparing a paste comprising metal fine particles and a thickener;
(b) atomizing the paste and applying the atomized paste to at least one surface of a metal foil;
(c) drying the paste applied to the metal foil and sintering the paste together with the metal foil in a reducing atmosphere, thereby producing at least one porous material layer diffusion-bonded to the metal foil; and (d) processing the metal foil, having the porous material layer diffusion-bonded thereto, into a three-dimensional structure which is substantially deformed from a major plane of the metal foil.

In the above-mentioned first method, it is preferable that step (d) comprise: forming, in the metal foil having the porous material layer diffusion-bonded thereto, a plurality of slits in a fixed direction at fixed intervals in X- and Y-(planar) direction rows; and causing a strip-shaped portion between laterally spaced slits to bulge in a Z-(thickness) direction from the front or back side of the metal foil, wherein a plurality of said strip-shaped portions bulge from opposite sides of said metal foil, alternating in the X- and/or Y-direction.

The present invention also includes a second method of producing an electrode core material, comprising the steps of:
  (a) preparing a paste comprising metal fine particles and a thickener;
  (b) producing a substrate comprising a metal foil processed into a three-dimensional structure which is substantially deformed from a major plane of said metal foil;
  (c) atomizing the paste and applying the atomized paste to at least one surface of the substrate; and
  (d) drying the paste applied to the substrate and sintering the paste together with the substrate in a reducing atmosphere, thereby producing at least one porous material layer diffusion-bonded to the substrate.

In the above-mentioned second method, it is preferable that the step (b) comprise: forming, in the above-mentioned metal foil, a plurality of slits in a fixed direction at fixed intervals in X- and Y-(planar) direction rows; and causing a strip-shaped portion between laterally spaced slits to bulge in the Z-(thickness) direction from the front or back side of the metal foil, wherein a plurality of said strip-shaped portions bulge from opposite sides of said metal foil, alternating in the X- and/or Y-direction, thereby producing the substrate.

It is also preferable in both methods that the atomizing step be carried out using a binary-fluid nozzle.

It is preferable that the above-mentioned metal fine particles comprise carbonyl nickel powder. It is also preferable that the metal fine particles further comprise at least one additive powder selected from the group consisting of a cobalt powder and a cobalt compound powder, the amount of the additive powder preferably being about 3 to 10 parts by weight per 100 parts by weight of the carbonyl nickel powder.

The present invention also includes an alkaline storage battery comprising:
  a positive electrode plate; a negative electrode plate; a separator interposed between the positive electrode plate and the negative electrode plate; and an alkaline electrolyte;
  at least one of the positive electrode plate and the negative electrode plate comprising a core material and an active material;
  the core material comprising a substrate and at least one porous material layer diffusion-bonded to the substrate;
  the substrate comprising a metal foil having a three-dimensional structure which is substantially deformed from a major plane of the metal foil;
  the porous material layer having a three-dimensional structure which is substantially uniform in thickness and porosity; and
  at least a portion of the active material being filled into pores of the porous material layer to form a mixed layer comprising the metal fine particles and the active material.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The electrode core material in accordance with the present invention comprises a substrate and at least one porous material layer formed on the substrate. The porous material layer reduces the stress at the interface between the substrate and the active material layer during the pressing of the electrode plate, thereby suppressing the peeling between the core material and the active material layer. The porous material layer comprises metal fine particles that are diffusion-bonded to one another and has a uniform three-dimensional structure extending over the substrate. Accordingly, the active material is embedded into the pores of the porous material layer at the interface between the active material layer and the core material to form a mixed layer comprising the metal fine particles and the active material. This enables the production of an electrode plate capable of withstanding the expansion and contraction of the active material during charge/discharge.

The thickness of the porous material layer formed on each side of the substrate is preferably about 5 to 50 µm, and more preferably about 30 to 40 µm. A porous material layer having a thickness of less than about 5 µm results in an insufficient reduction in the stress at the interface between the core material and the active material layer. On the other hand, a porous material layer having a thickness of more than about 50 µm does not provide a preferred further effect and impedes the achievement of a higher battery capacity.

The porosity of the porous material layer is preferably about 80 to 95%, and more preferably about 85 to 90%. A porous material layer having a porosity of less than about 80% is difficult to be deformed during the pressing of the electrode plate, thereby making it difficult to sufficiently reduce the stress at the interface between the core material and the active material layer. On the other hand, a porous material layer having a porosity of more than about 95% cannot be sufficiently bonded to the substrate.

The above-mentioned substrate comprises a metal foil processed into a three-dimensional structure. While a rolled nickel foil, a nickel-plated rolled iron foil, an electrolytic nickel foil, or the like may preferably be employed as the metal foil, an electrolytic nickel foil is most preferable. In the case of an electrolytic nickel foil, a thin foil having a thickness of about 10 to 35 µm, which is not attainable by rolling of metal, is available at low cost. The use of such a thin metal foil, having a thickness of not more than about 35 µm, as the substrate enables the achievement of a higher battery capacity. However, a metal foil having a thickness of less than about 10 µm is not easy to be handled, and is therefore difficult to be processed into a three-dimensional structure or to be applied with a paste containing an active material, without causing any fracture.

Figure 1:
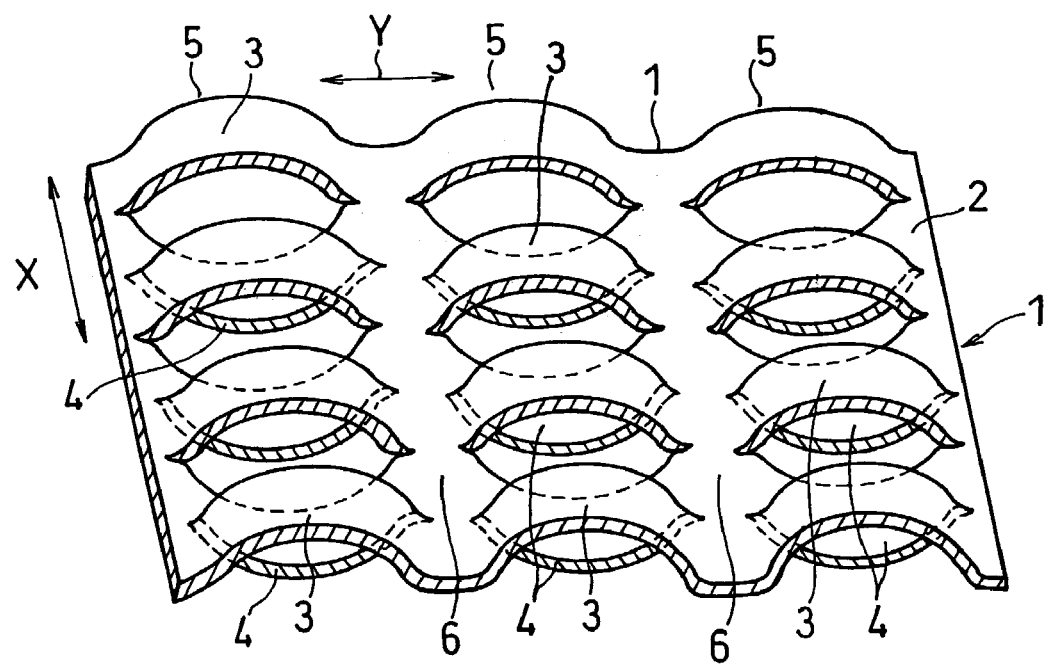
FIG. 1 is an oblique view of an embodiment of a substrate comprising a metal foil processed into a three-dimensional structure, which is used to manufacture an electrode core material in accordance with the present invention.

FIG. 1 shows an oblique view of an embodiment of a substrate comprising a metal foil processed into a three-dimensional structure. A substrate 1 comprises a metal foil 2, in which slits in the longitudinal direction (the Y direction in FIG. 1) are formed along the width direction (the X direction in FIG. 1) at fixed intervals. Then, strip-shaped portions, each sandwiched between two (laterally spaced) slits, are bulged in the Z or thickness direction from the front and back sides of the metal foil (i.e., out of the X-Y plane of the foil) in an alternating manner in the X or width direction, thereby forming arch-shaped or curved bulge portions 3 and 4. The bulge portions 3 and 4 are aligned in the X direction to form a bulge portion row 5. A plurality of the bulge portion rows 5 is repeatedly formed, with a flat portion 6 having a predetermined width interposed between the bulge portion rows 5.

In the case of using a core material X as described in Japanese Unexamined Patent Publication No. Hei 7-130370, the localized generation of gas occurs at the through-hole portion of the core material during charge/discharge of the battery, so that the active material is likely to peel off the core material, starting from the through-hole portion. This becomes the cause of the reduction in cycle characteristic, discharge characteristic and the like. On the other hand, a substrate 1 as shown in FIG. 1 does not have any through holes in the Z- or thickness direction of the substrate (i.e., perpendicular to the substrate face or plane), and thus it is difficult to cause the above-described localized generation of gas, thereby yielding a battery having an excellent cycle characteristic and discharge characteristic.

Figure 2:
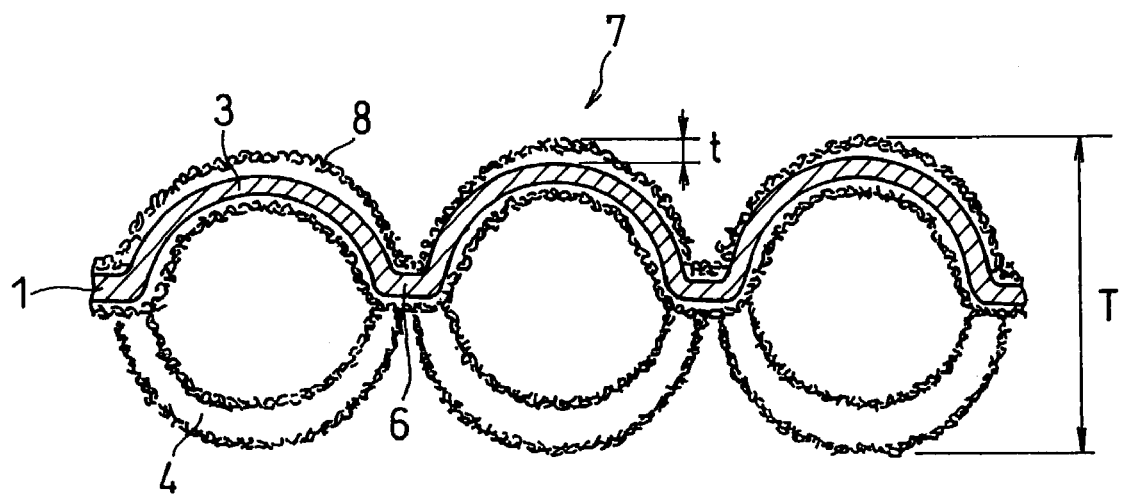
FIG. 2 is a sectional view of an embodiment of an electrode core material in accordance with the present invention.

Next, FIG. 2 shows a preferred embodiment of an electrode core material employing the substrate 1 shown in FIG. 1.

FIG. 2 is a sectional view of the core material 7. Disposed on each surface of the substrate 1 provided with the bulge portions 3 and 4, is a porous material layer 8 comprising diffusion-bonded metal fine particles. In FIG. 2, the thickness of the porous material layer 8 is denoted by "t", and the apparent thickness of the electrode core material 7 is denoted by "T". The ratio of "t" to "T", that is, t/T is preferably about 1/30 to 1/6.

An electrode core material as shown in FIG. 2 may be produced, for example, in the following manner.

First, a paste comprising metal fine particles and a thickener is prepared. As the metal fine particles, carbonyl nickel powder (nickel powder produced by carbonyl process) is preferably used, because of the ease of forming a porous material layer having a three-dimensional structure by diffusion-bonding thereof. In addition, at least one additive powder selected from the group consisting of a cobalt powder and a cobalt compound powder may also be used together with carbonyl nickel powder, from the viewpoint of producing a core material having an excellent current collection property. The mean primary particle size of the metal fine particles is preferably about 0.5 to 2 µm, for example.

Since the primary particles of carbonyl nickel powder have either a star shape or a shape in which there are many protrusions on the surface of the particles, they are generally available in the form of agglomerated particles. This fact that the primary particles of carbonyl nickel powder form agglomerated particles is considered to be one reason for the ease of forming a uniform three-dimensional structure by diffusion-bonding. Therefore, it is believed that any metal powder which forms agglomerated particles is capable of forming a uniform three-dimensional structure by diffusion-bonding, as in the case of carbonyl nickel powder.

The amount of at least one additive powder selected from the group consisting of a cobalt powder and a cobalt compound powder is preferably about 3 to 10 parts by weight per 100 parts by weight of carbonyl nickel powder. It is believed that the use of a cobalt powder or a cobalt compound powder also provides the effect of reducing the generation of hydrogen at the positive electrode in reverse charging. Examples of suitable cobalt compounds include, but are not limited to, cobalt oxide, cobalt carbonate and cobalt hydroxide.

As a thickener, a water-soluble resin is preferably employed. Examples of suitable water-soluble resins include cellulose derivatives, such as carboxymethyl cellulose, methyl cellulose or hexamethyl cellulose, polyvinylalcohol and polyamide.

As a dispersion medium for the paste, water is preferably used. For example, an aqueous solution with a water-soluble resin dissolved therein may be kneaded with metal fine particles to produce a paste. Although there is no particular limitation with respect to the amount of the thickener, it is preferably about 1 to 5 parts by weight per 100 parts by weight of metal fine particles. There is no particular limitation with respect to the amount of the dispersion medium.

Figure 3:
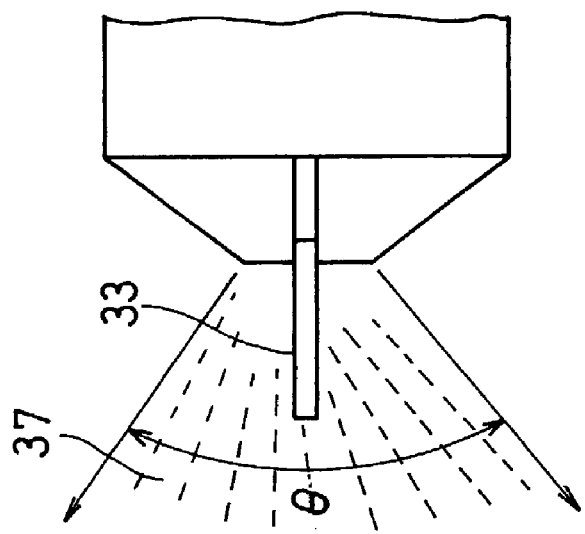
FIG. 3 is a front view of an example of a binary-fluid nozzle used in the production methods of the present invention.
Figure 4:
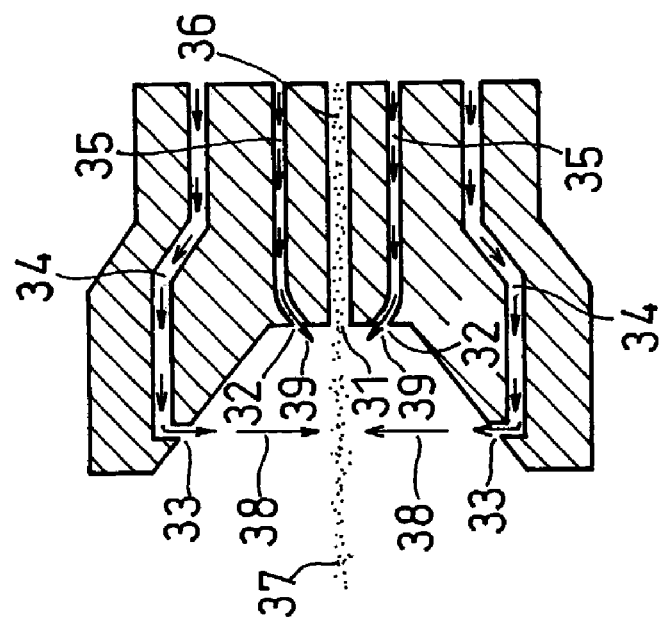
FIG. 4 is a sectional view of the binary-fluid nozzle, taken on line IV-IV, in FIG. 3.
Figure 5:
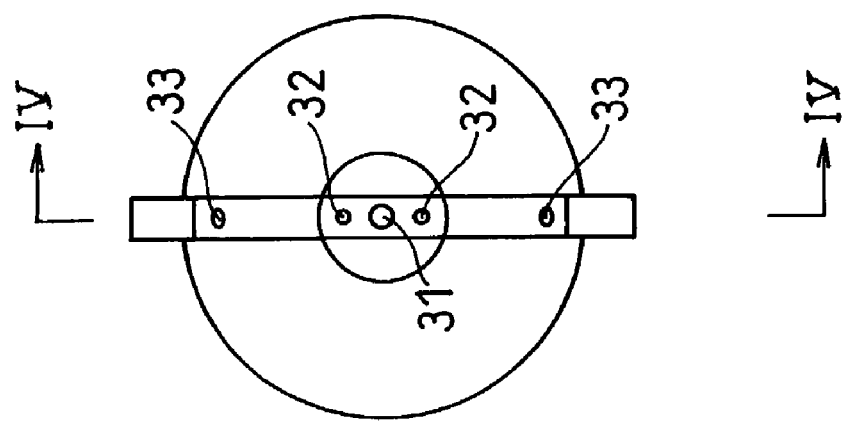
FIG. 5 is a top plan view of the binary-fluid nozzle shown in FIG. 3.

Next, the above-described paste is applied to at least one surface of a metal foil. In order to form a thin coating of the paste, it is preferable to spray the paste on the metal foil by using a binary-fluid nozzle as shown in FIGS. 3 to 5. The reasons are as follows. Although a single-fluid nozzle, which is advantageous in terms of productivity, may also be used, metal fine particles are likely to clog the nozzle. Moreover, it is difficult to atomize a paste by using a single-fluid nozzle.

The use of a roll coater enables the formation of a thin coating, but is problematic in that it causes the metal foil to be distorted and necessitates a large-scale facility. In addition, there is a method available in which a paste is applied onto the surface of a metal foil, followed by spraying compressed air to remove the excessive paste. However, since a paste containing metal fine particles has a high viscosity, this method requires a high air velocity, which causes air turbulence resulting in a non-uniform coating.

Another possible method is a quantitative application of a paste by using a die. However, in order to form a thin coating having a thickness of about 5 to 50 µm on the surface of a metal foil, the tip of the die should be brought as close as possible to the metal foil. Accordingly, there is a great possibility that the tip of the die and the metal foil surface may contact with each other. The contact of the die with the metal foil surface causes scratches on the tip of the die, causing degradation of the die. It is possible to increase the distance between the die and the metal foil by increasing the water content of a paste. However, a paste having a high water content requires a longer time to be dried and also causes a greater settling of metal fine particles, so that this method still has a productivity problem.

In contrast, in the case of using a binary-fluid nozzle, the paste can be readily atomized and applied onto the metal foil surface. In a binary-fluid nozzle, separate paths are provided as a paste flow channel and a compressed air flow channel leading to the outside of the nozzle. The paste collides with compressed air outside the nozzle, thereby atomizing the paste into fine particles. The mean particle size of the atomized fine particles is preferably about 10 to 100 μm.

FIG. 3 shows a front view of an example of a binary-fluid nozzle; FIG. 4 shows a sectional view of the same nozzle, taken on line IV-IV; and FIG. 5 shows a top plan view thereof. This binary-fluid nozzle has patterned air flow channels 34 and atomization air flow channels 35 for the flow of compressed air, and a paste flow channel 36 for the flow of paste. At the center of the nozzle tip, a paste outlet 31 is disposed, and atomization air outlets 32 are provided above and below the paste outlet 31. The paste discharged from the paste outlet 31 is immediately atomized by atomization air 39 discharged from the atomization air outlets 32. The atomized paste flow passes between a pair of patterned air outlets 33 placed at some distance from the nozzle tip. At that time, a patterned air 38 jetting from the patterned air outlets 33 causes the atomized paste 37 to scatter in radial directions. Radiation angle θ (see FIG. 5), which represents the scattering of the paste, changes depending on the pressure of compressed air and the specific gravity of the paste.

The use of such a binary-fluid nozzle enables suppression of the most serious problem of atomization methods, that is, the unstable application of metal fine particles caused by clogging of the nozzle. Moreover, unlike the case of using a type of nozzle which atomizes a paste by mixing the paste with compressed air inside the nozzle and spraying the paste with the compressed air, the paste does not solidify inside the nozzle, so that it is possible to realize an excellent productivity.

After uniformly applying the paste to the metal foil, the paste is dried and then sintered together with the metal foil in a reducing atmosphere, thereby forming at least one porous material layer diffusion-bonded to the metal foil. The reducing atmosphere is preferably an atmosphere containing water vapor in the presence of both hydrogen and nitrogen. In addition, the sintering temperature is preferably 800 to 1200° C., and more preferably 950 to 1000° C.

Subsequently, the metal foil having a porous material layer diffusion-bonded thereto is processed into a three-dimensional structure to produce an electrode core material. Here, the processing is preferably performed such that the metal foil having the porous material layer diffusion-bonded thereto has the same structure as that of the core material 7 shown in FIG. 2. More specifically, slits in a fixed direction are formed in the metal foil, having the porous material layer diffusion-bonded thereto, at fixed intervals in X- and Y-direction rows, and a strip-shaped portion sandwiched between two slits is caused to bulge from the front and back sides of the core material in an alternating manner, the alternation being in the X- and/or Y-direction. Since an electrode core material thus produced has a three-dimensional structure even at a portion thereof located in the vicinity of the surface of the electrode plate, the use of this electrode core material can improve the current collection property of the active material located at the surface portion of the electrode plate and the ability of the electrode to retain the active material located at the surface portion.

Here, it is desirable to design the core material such that the apparent thickness "T" thereof is preferably about 50 to 95%, and more preferably about 70 to 90% of the thickness of the resulting electrode plate having active material layers formed thereon. A core material having an apparent thickness "T" of more than about 95% of the thickness of the electrode plate is highly likely to be exposed on the surface of the electrode plate, leading to problems, such as self-discharge, localized generation of gas and minute short-circuit. On the other hand, a core material having an apparent thickness "T" of less than about 50% of the thickness of the electrode plate is not expected to significantly improve the active material retention achieved by processing the core material into a three-dimensional structure, and is also likely to reduce the current collection property at the electrode plate surface.

In the case of applying a paste to a substrate comprising a metal foil processed into a three-dimensional structure by a method other than one using a binary-fluid nozzle, the uniformity of a coating is prone to be impaired. Therefore, it is preferable to apply the paste to an unprocessed metal foil and sinter the paste together with the metal foil, and thereafter to process the resultant sintered material into a three-dimensional structure, as described above. In this case, while there is a fear of deterioration of processing machines during the processing of a sintered material, the scattering of metal fine particles rarely occurs when a porous material layer and a substrate are sufficiently bonded to each other. Thus, such fear can be eliminated by using dust collecting equipment in the surrounding area of processing machines.

In the case of using a binary-fluid nozzle, a paste can be relatively uniformly applied to a metal foil, even after processing the metal foil into a three-dimensional structure. Accordingly, it is possible to perform the step of applying the paste onto at least one surface of a substrate without any serious problems, after producing the substrate comprising a metal foil processed into a three-dimensional structure. Thereafter, the paste applied to the substrate is dried and then sintered together with the substrate in a reducing atmosphere, thereby producing at least one porous material layer diffusion-bonded to the substrate.

The invention will now be illustrated in more detail with reference to the following specific, non-limiting examples.

EXAMPLE 1

(i) Production of Substrate

A pure nickel foil having a thickness of 20 μm and a weight density of 170 g/m$^2$ was produced by electrolytic plating.

(ii) Formation of Porous Material Layer

Carbonyl nickel powder having a mean primary particle size of 1 μm was dispersed in a cellulose aqueous solution serving as a thickener to give a paste having a solid content of 35 wt %.

Here, as the above-mentioned cellulose aqueous solution, a mixed solution of SM400™ (manufactured by Shin-Etsu Chemical Co., Ltd.) having a cellulose concentration of 3 wt % and 65SH™ (manufactured by Shin-Etsu Chemical Co., Ltd.) having a cellulose concentration of 1 wt % was used. The mixing ratio was set such that the weight ratio of the cellulose component of SM400™ to that of 65SH™ was 3:1. As the above-mentioned carbonyl nickel powder, #255™ (manufactured by INCO Ltd.) having a mean primary particle size of 1 μm was used.

The above-described paste was applied to both surfaces of the nickel foil by spraying the paste from a binary-fluid nozzle (manufactured by Fuso Seiki Co., Ltd.) onto both surfaces of the nickel foil. At that time, adjustments were made such that the spraying pressures exerted on the front and back sides of the nickel foil were substantially equal and that the weight density of the nickel powder after sintering was 60 g per unit area of the nickel foil. In this example, a binary-fluid nozzle having the same configuration as that shown in FIGS. 3 to 5 was employed. The flow rate of compressed air was adjusted such that the paste scattered within the range wherein radiation angle θ=100°. Measurement using a laser Doppler method showed that the mean particle size of the atomized fine particles of the paste was 20 μm.

Subsequently, the paste applied to the nickel foil was dried to vaporize the water content therefrom, and then sintered together with the nickel foil at 950° C. for 15 minutes in an atmosphere containing water vapor in the presence of both hydrogen and nitrogen, thereby removing all of the organic matters therefrom. This gave a porous material layer comprising diffusion bonded fine particles of nickel powder and having a uniform three-dimensional structure, with the porous material layer being diffusion-boned to the nickel foil. The thickness of each of the porous material layers on the nickel foil was 30 μm, and the porosity thereof was 89%.

Next, in the nickel foil having the porous material layer diffusion-bonded to both surfaces thereof, 2-mm slits in a fixed direction were formed at an interval of 0.5 mm in X- and Y-direction rows, and a strip-shaped portion sandwiched between two slits was caused to bulge from the front and back sides of the nickel foil in an alternating manner in the X-direction in FIG. 1, thereby completing electrode core material "a" having a shape as shown in FIGS. 1 to 2. The apparent thickness "T" of the electrode core material after being processed into a three-dimensional structure was set at 500 μm. Accordingly, the ratio of the thickness "t" of the porous material layer to the apparent thickness "T":t/T was 0.06.

EXAMPLE 2

(i) Production of Substrate

A pure nickel foil having a thickness of 20 μm and a weight density of 170 g/m² was produced by electrolytic plating. Next, in the above-described nickel foil, 2-mm slits in a fixed direction were formed at an interval of 0.5 mm in X- and Y-direction rows, and a strip-shaped portion sandwiched between two slits was caused to bulge from the front and back sides of the nickel foil in an alternating manner in the X-direction in FIG. 1, thereby completing a substrate having a three-dimensional structure as shown in FIG. 1. The apparent thickness of the substrate after being processed into a three-dimensional structure was set at 440 μm.

(ii) Formation of Porous Material Layer

The same paste as that of Example 1 containing carbonyl nickel was prepared. The paste was applied to the above-described substrate by using the same binary-fluid nozzle as that used in Example 1, followed by drying, and the substrate applied with the paste was sintered. All processes were conducted under the same conditions as in Example 1. This gave a porous material layer comprising diffusion-bonded fine particles of nickel powder and having a uniform three-dimensional structure, with the porous material layer being diffusion-boned to the substrate. The thickness of each of the porous material layers on the nickel foil was 30 μm, and the porosity thereof was 89%. Accordingly, the ratio of the thickness "t" of the porous material layer to the apparent thickness "T":t/T was 0.06. The resultant electrode core material is referred to as electrode core material "b".

Incidentally, when the spraying pressures from the binary-fluid nozzle were not adjusted to be substantially equal at the front and back sides of the substrate during the application of the paste, a non-uniform coating occurred to cause losses.

EXAMPLE 3

Electrode core material "c" was produced in the same manner as in Example 1, except for adding with the paste of Example 1, 5 parts by weight of cobalt oxide (CoO powder) per 100 parts by weight of carbonyl nickel powder.

COMPARATIVE EXAMPLE 1

The substrate produced in Example 2 having a three-dimensional structure was used as electrode core material "d", i.e., without the porous material layer.

EXAMPLE 4

Electrode core material "e" was produced in the same manner as in Example 1, except for using electrolytic nickel powder (mean particle size 3 μm) in place of carbonyl nickel powder.

(iii) Production of Positive Electrode Plate for Alkaline Storage Battery

First, nickel hydroxide powder serving as a positive electrode active material was synthesized by a known method described in the following. Specifically, a sodium hydroxide aqueous solution was dropped slowly into an aqueous solution in which nickel sulfate as the main component and predetermined amounts of cobalt sulfate and zinc sulfate were dissolved, while adjusting the pH of the aqueous solution with ammonia water, thereby precipitating spherical particles of a solid solution nickel hydroxide. The solid solution nickel hydroxide particles precipitated by this method were washed with water and then dried to give an active material.

Cobalt hydroxide serving as a conductive agent of the positive electrode was produced by a known method described in the following. Specifically, a 1 mol/L cobalt sulfate aqueous solution was slowly dropped into a sodium hydroxide aqueous solution, while stirring at 35° C. to maintain the pH of the aqueous solution at 12, thereby precipitating fine particles of cobalt hydroxide (β type).

Next, 100 parts by weight of the solid solution nickel hydroxide particles, 10 parts by weight of the cobalt hydroxide fine particles, 0.2 parts by weight of carboxymethyl cellulose (CMC) and a suitable amount of water were mixed together. Here, CMC was made into an aqueous solution at a concentration of 1 wt % prior to use. To the resultant mixture, a latex (AFLAS 150™, manufactured by Asahi Glass Co., Ltd.) containing a tetrafluoroethylene-propylene copolymer as a solid content was further added such that the solid content of the latex was 3.3 wt % with respect to the solid solution nickel hydroxide particles, thereby preparing a positive electrode paste.

The above-described positive electrode paste was applied to the electrode core materials produced in Examples 1 to 4 and Comparative Example 1, and the resultant electrode plates were dried with a hot air at 110° C. for 10 minutes. Subsequently, the dried electrode plates were rolled into a thickness of 400 μm by a roller and then cut to produce positive electrode plates "a", "b", "c" and "e" respectively comprising the core materials of Examples 1, 2, 3 and 4 of the present invention, and positive electrode plate "d" comprising the core material of Comparative Example 1.

(iv) Production of Alkaline Storage Battery

Figure 6:
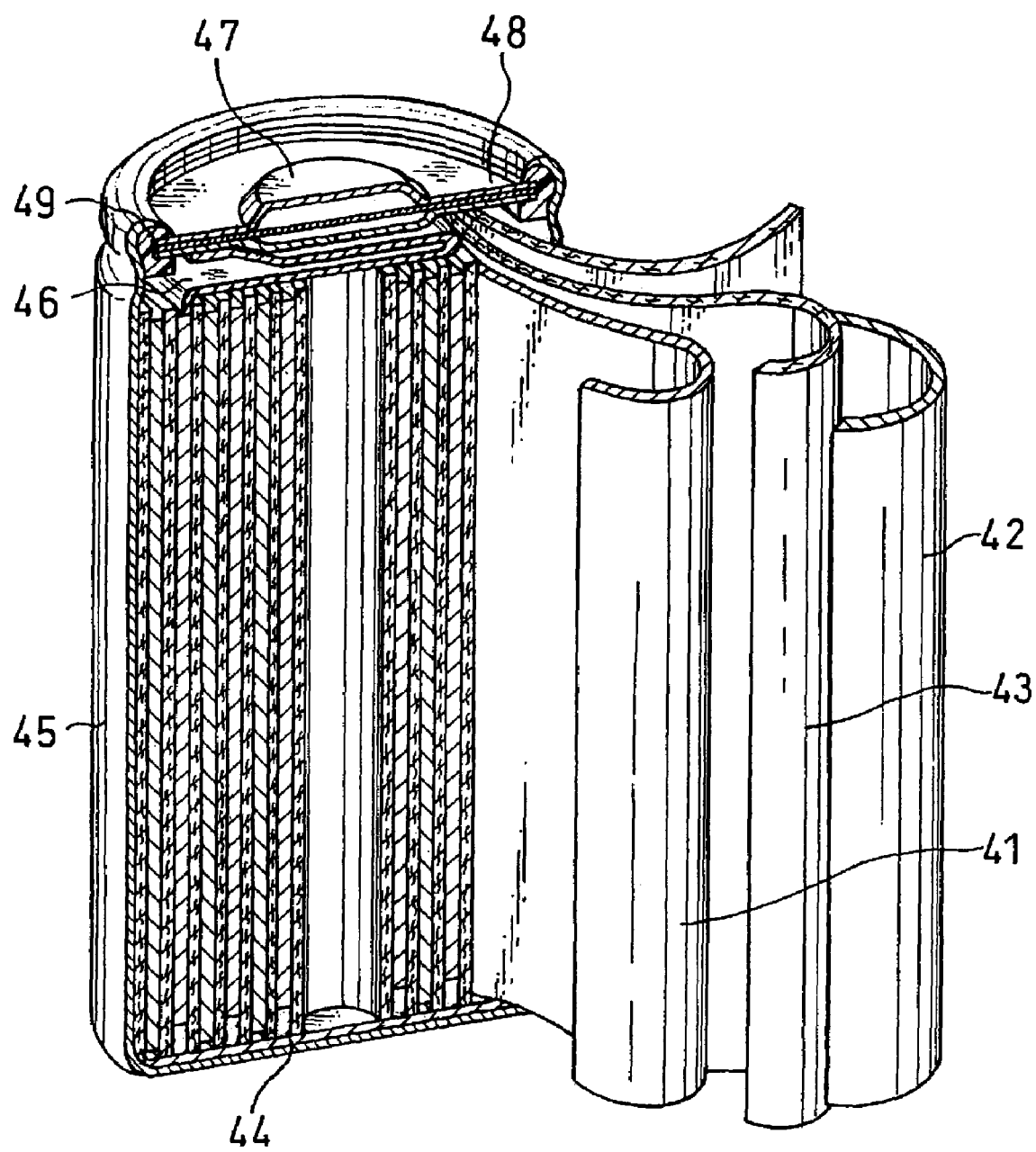
FIG. 6 is a sectional oblique view showing the internal structure of an embodiment of an alkaline storage battery in accordance with the present invention.

Positive electrode plates "a" to "e" produced as above were used to respectively produce SC-size nickel-metal hydride storage batteries A to E as shown in FIG. 6, each having a nominal capacity of 3500 mAh.

Here, a negative electrode composed mainly of a hydrogen storage alloy and a polypropylene separator imparting hydrophilicity were employed. Further, an 8N aqueous alkaline solution in which potassium hydroxide was dissolved as the main component was used as an electrolyte.

First, a positive electrode plate 41 and a negative electrode plate 42 were spirally wound, with a separator 43 interposed therebetween, thereby producing an electrode assembly. On the bottom surface of the electrode assembly, an end in the minor direction of the negative electrode was protruded, and a current collector plate 44 was welded to the protruded end. Then, the whole structure was housed in a battery case 45. The current collector plate 44 was spot-welded to the inner bottom surface of the battery case 45. Subsequently, the electrolyte was injected into the battery case 45 to impregnate the electrode assembly with the electrolyte. Then, a positive electrode lead 46 was connected to the inner surface of a sealing plate 48 having a positive electrode terminal 47. The current collection of the negative electrode was also performed by contacting a part of the negative electrode plate 42 with the inner surface of the battery case 45. Finally, the opening of the battery case 45 was sealed with the sealing plate 48, and the opening end was clamped to a gasket 49 disposed on the periphery of the sealing plate 48, thereby sealing the battery.

As compared with commercially available SC-size batteries having a nominal capacity of about 3000 mAh, batteries A to E had a considerably higher capacity (3500 mAh). The reason was presumably that each of the core materials of the positive electrodes used in batteries A to E had a small thickness and high flexibility, so that the positive electrode plate and the negative electrode plate were spirally wound without any gap therebetween.

(v) Evaluation of Alkaline Storage Battery

Utilization Rate of Positive Electrode Active Material

Each battery was subjected to two initial charge/discharge cycles in a mode in which the battery was charged at a charge current of 350 mA for 15 hours and then discharged at a discharge current of 700 mA for four hours. Subsequently, aging was performed on each battery at 45° C. for three days in order to promote the activation of the negative electrode alloy.

Thereafter, the utilization rate of the positive electrode active material of each battery was evaluated under four different types of charge/discharge conditions.

Each battery was charged at a charge current of 700 mA for 7.5 hours, and after a suspension of 30 minutes, the battery was discharged at a discharge current of 3500 mA (1 C rate), 10 A, 20 A or 30 A until the battery voltage reached 0.8 V. The results are shown in TABLE 1.

Here, the active material utilization rates shown in TABLE 1 are percentage values (%) determined by dividing the discharge capacity (the capacity until the battery voltage reached 0.8 V) obtained in each test by the theoretical capacity of the positive electrode of each battery. In addition, the theoretical capacity of the positive electrode was determined by multiplying the weight (g) of nickel hydroxide in the positive electrode active material by a capacity density of 289 mAh/g, which was based on the assumption that nickel hydroxide underwent one electron reaction.

TABLE 1

|  | Active material utilization rate (%) | | | |
| --- | --- | --- | --- | --- |
| Discharge current | 1 C | 10 A | 20 A | 30 A |
| Example 1 | 97 | 93 | 90 | 88 |
| Example 2 | 97 | 92 | 88 | 84 |
| Example 3 | 97 | 93 | 90 | 88 |
| Comparative Ex. 1 | 90 | 75 | 68 | 60 |
| Example 4 | 95 | 90 | 86 | 80 |

Charge/Discharge Cycle Characteristics

Figure 7:
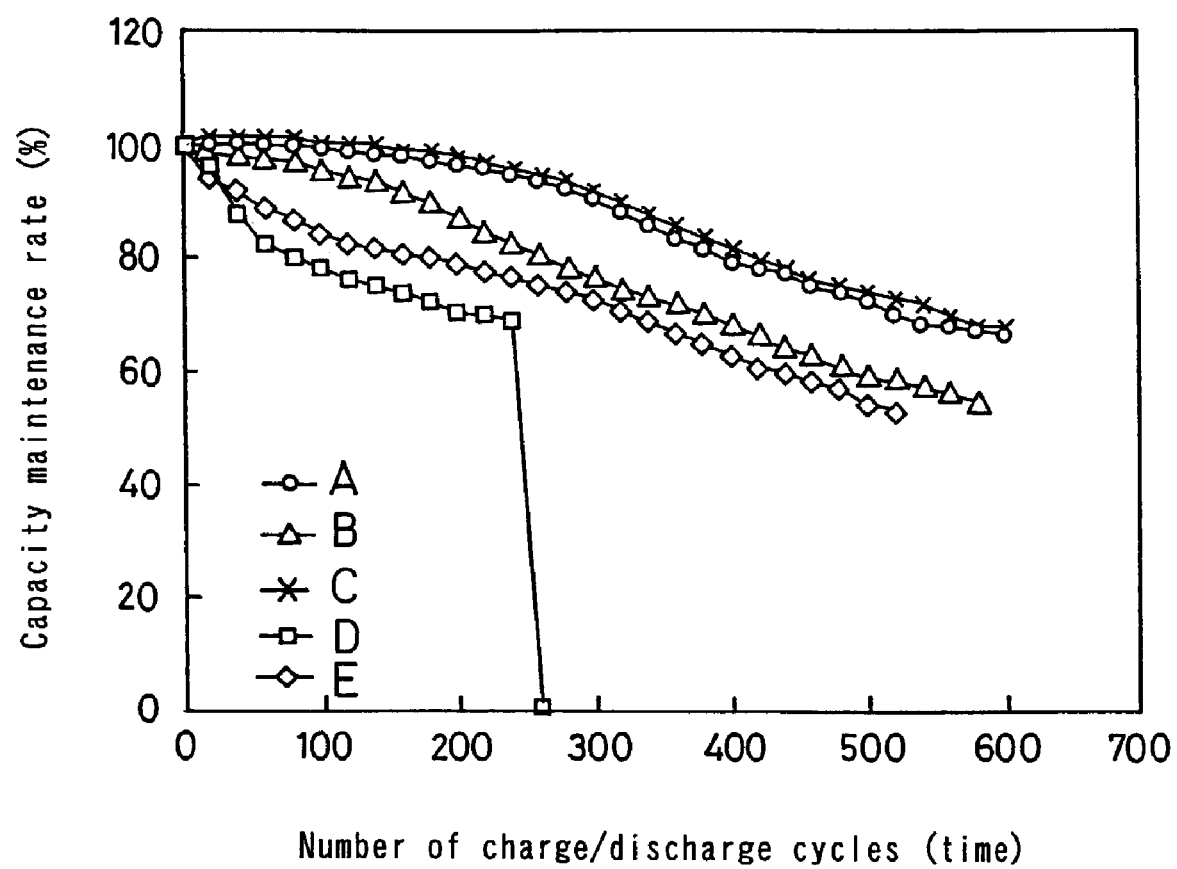
FIG. 7 is a graph showing the relation between the capacity maintenance rate and number of charge/discharge cycles of each of batteries A, B, C and E of Examples 1, 2, 3 and 4 of the present invention and battery D of Comparative Example 1 (in the case of an end-of-discharge voltage of 0.8 V).

Charge/discharge cycles were repeatedly performed on each battery under conditions in which the battery was charged at a charge current of 3500 mA in a dT/dt (dT=1.5° C., dt=30 sec.) control mode and then discharged at a discharge current of 10 A until the battery voltage reached 0.8 V. Thereafter, the relation between the capacity maintenance rate (%) to the initial discharge capacity and the number of cycles was obtained. The respective results of batteries A to E are shown in FIG. 7.

Figure 8:
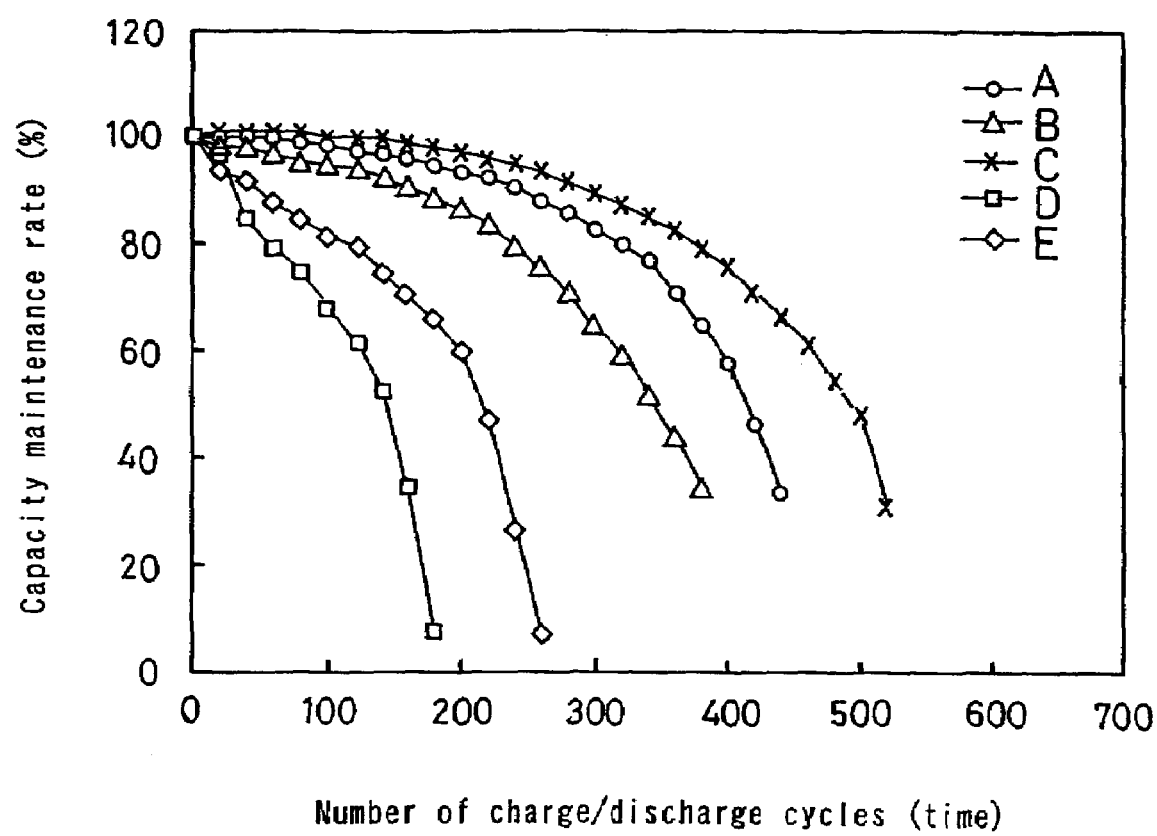
FIG. 8 is a graph showing the relation between the capacity maintenance rate and number of charge/discharge cycles of each of batteries A, B, C and E of Examples 1, 2, 3 and 4 of the present invention and battery D of Comparative Example 1 (in the case of an end-of-discharge voltage of 0 V).

Next, charge/discharge cycles were repeatedly performed on each battery under conditions in which the battery was charged at a charge current of 3500 mA in a dT/dt (dT=1.5° C., dt=30 sec.) control mode and then discharged at a discharge current of 10 A until the battery voltage reached 0 V. Thereafter, the relation between the capacity maintenance rate (%) to the initial discharge capacity and the number of cycles was obtained. The results are shown in FIG. 8.

(vi) Discussion of Evaluation Results

From TABLE 1, it is seen that the active material utilization rates of batteries A to C produced by using the core materials of Examples 1 to 3 of the present invention are of a higher standard, as compared with batteries D and E produced by using the core materials of Comparative Example 1 and Example 4. It is also seen that battery A has a higher current collection property and more excellent active material utilization rate than battery B. The reason is presumably that, during application of the paste, the agglomerated particles of nickel powder were more uniformly attached to the nickel foil serving as the substrate in the case of the core material of Example 1, as compared with the case of the core material of Example 2.

The reasons that batteries A to C exhibited an excellent high-rate discharge characteristic are believed to be as follows.

First, unlike the core material of Comparative Example 1, the core materials of Examples 1 to 3 of the present invention had, on each surface thereof, a porous material layer having a three-dimensional structure. It is believed that this suppressed a phenomenon such as the peeling of the active material layer from the core material during the pressing in the manufacturing process of the positive electrode plate. Additionally, it is believed that positive electrodes "a" to "c" using the core materials of Examples 1 to 3 had an increased contact area between the core material and the active material due to the presence of the porous material layer, and therefore were improved in current collection property.

Next, since the core materials of Examples 1 to 3 had a porous material layer having a uniform three-dimensional structure and comprising diffusion-bonded agglomerated fine particles of nickel powder, they might have a more three-dimensional surface than the core material of Example 4 obtained by using electrolytic nickel powder. Accordingly, it is believed that the stress caused by the difference in rate of elongation between the active material layer and the core material and any resulting peeling of the active material layer from the core material, which may have occurred during the pressing of the electrode plates, were more suppressed in positive electrodes "a" to "c" of Examples 1 to 3 than in positive electrode "e" of Example 4. This is presumably the reason that batteries A to C had a higher current collection property and more excellent active material utilization rate than battery E. In addition, it is believed that the core material of Example 4 obtained by using electrolytic nickel powder was inferior to the core materials of Examples 1 to 3 in uniformity of the three-dimensional structure, because electrolytic nickel powder had a relatively regular spherical shape.

From FIG. 7, it is seen that the charge/discharge cycle characteristics of batteries A to C produced by using the core materials of Examples 1 to 3 of the present invention are of a higher standard, as compared with batteries D and E produced by using the core materials of Comparative Example 1 and Example 4. It is believed that the core material of Example 1 had an excellent active material holding ability and therefore provided a particularly great effect of suppressing the peeling of the active material layer from the core material, which would otherwise have been caused by the expansion and contraction of the active material during charge/discharge.

From FIG. 8, it is seen that the charge/discharge cycle characteristic of battery C produced by using the core material of Example 3 of the present invention is of a higher standard, as compared with battery A produced by using the core material of Example 1. This difference in the characteristic was presumably attributed to the fact that, when the end-of-discharge voltage was set at 0 V, the positive electrode active material was partly in a reverse charged state, causing the generation of hydrogen in the vicinity of the core material. In other words, it is believed that the peeling between the core material and the active material layer due to the generation of hydrogen was more suppressed in battery C containing cobalt in the surface portion of the core material, because the battery had an excellent adhesion between the core material and the active material layer.

As described above, an electrode core material in accordance with the present invention makes it possible to produce an alkaline storage battery having a high active material utilization rate and excellent charge/discharge cycle characteristic. Moreover, an electrode core material in accordance with the present invention can be produced by a simple method at low cost.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. An electrode core material comprising: a substrate comprising a metal foil having a three-dimensional structure which is substantially deformed from a major plane of the metal foil, such that the three-dimensional structure comprises a plurality of curved bulges protruding from at least one of a front and a back side of said substrate; and at least one porous material layer comprising a matrix of sintered metal fine particles diffusion-bonded to the three-dimensional structure in a substantially uniform thickness, wherein the porous material layer has a substantially uniform porosity, the curved bulges have a strip-shaped form which is laterally bounded by slits in the metal foil, and the slits penetrate through the metal foil and extend from the front side through the back side of the substrate.

2. The electrode core material in accordance with claim 1, wherein the curved bulges protrude in an alternating manner from the front and back sides of the substrate.

3. An electrode core material comprising: a substrate comprising a metal foil having a three-dimensional structure which is substantially deformed from a major plane of the metal foil, wherein the substantially deformed three-dimensional structure of the substrate comprises a plurality of rows of bulge portions and a flat portion having a predetermined width interposed between the rows of bulge portions, each of said rows of bulge portions comprising first and second strip-shaped curved bulge portions, said first and second strip-shaped, curved bulge portions protruding respectively from front and back sides of said substrate in an alternating manner along a first planar direction, said bulge portion rows being aligned along a second planar direction orthogonal to said first planar direction; and at least one porous material layer comprising a matrix of sintered metal fine particles diffusion-bonded to the three-dimensional structure in a substantially uniform thickness, and said porous material layer having a substantially uniform porosity.

4. The electrode core material in accordance with claim 1, wherein said porous material layer has a thickness of about 5 to 50 μm per one layer.

5. The electrode core material in accordance with claim 1, wherein said metal foil comprises electrolytic nickel and has a non-deformed thickness of about 10 to 35 μm.

6. An alkaline storage battery comprising: a positive electrode plate; a negative electrode plate; a separator interposed between said positive electrode plate and said negative electrode plate; and an alkaline electrolyte, wherein at least one of said positive electrode plate and said negative electrode plate comprises a core material and an active material, said core material comprising a substrate comprising a metal foil having a three-dimensional structure which is substantially deformed from a major plane of the metal foil, such that the three-dimensional structure comprises a plurality of curved bulges protruding from at least one of a front and a back side of said substrate; and at least one porous material layer comprising a matrix of sintered metal fine particles diffusion-bonded to the three-dimensional structure in a substantially uniform thickness, said porous material layer having a substantially uniform porosity, and at least a portion of said active material being filled into pores of said porous material layer to form a mixed layer comprising said metal fine particles and said active material, wherein the curved bulges have a strip-shaped form which is laterally bounded by slits in the metal foil, and the slits penetrate through the metal foil and extend from the front side through the back side of the substrate.

7. The electrode core material in accordance with claim 3, wherein said porous material layer has a thickness of about 5 to 50 μm per one layer.

8. The electrode core material in accordance with claim 3, wherein said metal foil comprises electrolytic nickel and has a non-deformed thickness of about 10 to 35 μm.

9. An alkaline storage battery comprising: a positive electrode plate; a negative electrode plate; a separator interposed between said positive electrode plate and said negative electrode plate; and an alkaline electrolyte, wherein at least one of said positive electrode plate and said negative electrode plate comprises a core material and an active material, said core material comprising a substrate comprising a metal foil having a three-dimensional structure which is substantially deformed from a major plane of the metal foil, wherein the substantially deformed three-dimensional structure of the substrate comprises a plurality of rows of bulge portions and a flat portion having a predetermined width interposed between the rows of bulge portions, each of said rows of bulge portions comprising first and second strip-shaped curved bulge portions, said first and second strip-shaped, curved bulge portions protruding respectively from front and back sides of said substrate in an alternating manner along a first planar direction, said bulge portion rows being aligned along a second planar direction orthogonal to said first planar direction; and at least one porous material layer comprising a matrix of sintered metal fine particles diffusion-bonded to the three-dimensional structure in a substantially uniform thickness, and said porous material layer having a substantially uniform porosity, and at least a portion of said active material being filled into pores of said porous material layer to form a mixed layer comprising said metal fine particles and said active material.

10. The electrode core material in accordance with claim 1, wherein the at least one porous material layer comprising a matrix of sintered metal fine particles is diffusion-bonded to the three-dimensional structure such that the surface of the three-dimensional structure is completely covered by the at least one porous material layer comprising a matrix of sintered metal fine particles.

11. The alkaline storage battery in accordance with claim 6, wherein the at least one porous material layer comprising a matrix of sintered metal fine particles is diffusion-bonded to the three-dimensional structure such that the surface of the three-dimensional structure is completely covered by the at least one porous material layer comprising a matrix of sintered metal fine particles.

12. The electrode core material in accordance with claim 1, wherein the at least one porous material layer covers the front side and the back side of the substrate.

13. The alkaline storage battery in accordance with claim 6, wherein the at least one porous material layer covers the front side and the back side of the substrate.

14. The electrode core material in accordance with claim 1, wherein the slits are longer than they are wide.

15. The alkaline storage battery in accordance with claim 6, wherein the slits are longer than they are wide.

16. The electrode core material in accordance with claim 3, wherein consecutive bulges in the second planar direction protrude in a same direction.

17. The alkaline storage battery in accordance with claim 9, wherein consecutive bulges in the second planar direction protrude in a same direction.

18. The electrode core material in accordance with claim 1, wherein each of the slits adjoins only two bulges.

19. The alkaline storage battery in accordance with claim 6, wherein each of the slits adjoins only two bulges.

* * * * *